United States Patent
Cuvillier et al.

(10) Patent No.: US 12,103,461 B2
(45) Date of Patent: Oct. 1, 2024

(54) TRIM ELEMENT COMPRISING COMMUTABLE BACKLIT AREAS

(71) Applicant: FAURECIA INTERIEUR INDUSTRIE, Nanterre (FR)

(72) Inventors: Christophe Cuvillier, Saint-Ouen-l'Aumône (FR); Armand Brousselle, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 133 days.

(21) Appl. No.: 17/993,545

(22) Filed: Nov. 23, 2022

(65) Prior Publication Data
US 2023/0158950 A1    May 25, 2023

(30) Foreign Application Priority Data
Nov. 23, 2021   (FR) ..................... 21 12382

(51) Int. Cl.
*B60Q 3/54*   (2017.01)
*B60Q 3/66*   (2017.01)

(52) U.S. Cl.
CPC ............. *B60Q 3/54* (2017.02); *B60Q 3/66* (2017.02)

(58) Field of Classification Search
CPC ... B60Q 3/54; B60Q 3/66; B60Q 3/12; B60Q 3/20; B60Q 3/60; B60K 2360/332; B60K 2360/336; B60K 2360/34; B60K 35/00; B60R 13/0243; B60R 13/0256; B60R 13/0262
See application file for complete search history.

(56) References Cited

U.S. PATENT DOCUMENTS

| | | | |
|---|---|---|---|
| 10,745,181 B2 * | 8/2020 | Duarte Da Cal | B65D 23/0842 |
| 2013/0027953 A1 | 1/2013 | Krier | |
| 2023/0098251 A1 * | 3/2023 | Brohm | G02B 6/0088 |

FOREIGN PATENT DOCUMENTS

| | | | | |
|---|---|---|---|---|
| CN | 109562863 A | * | 4/2019 | ......... A47G 19/2227 |
| DE | 102013223244 A1 | | 5/2015 | |
| DE | 102018102726 A1 | * | 8/2019 | ............. B60K 37/02 |
| EP | 3878693 A1 | * | 9/2021 | ............... B60Q 3/66 |
| FR | 3111857 A1 | | 12/2021 | |
| GB | 2589110 A | * | 5/2021 | ........... G02B 6/0021 |

OTHER PUBLICATIONS

French Search Report for Application No. 2112382, dated Jun. 29, 2022, 2 pages.

* cited by examiner

*Primary Examiner* — Abdullah A Riyami
*Assistant Examiner* — Syed M Kaiser
(74) *Attorney, Agent, or Firm* — Reising Ethington P.C.

(57) ABSTRACT

A trim element that includes a cover layer defining an outer surface and having at least two distinct backlit pattern areas, the trim element further including at least one lighting module having at least one light source and a first light guide arranged for guiding light from the light source toward the backlit areas of the cover layer. The trim element includes a switching module extending between the cover layer and the lighting module, the switching module having at least two optical shutter areas extending opposite every backlit pattern area of the cover layer and being configurable between an open position and a closed position.

10 Claims, 6 Drawing Sheets

TRIM ELEMENT COMPRISING COMMUTABLE BACKLIT AREAS

TECHNICAL FIELD

The present invention relates to a vehicle trim element comprising a cover (or coating) layer defining an outer surface and an inner surface opposite the outer surface, said cover layer comprising at least two distinct backlit pattern areas, wherein said cover layer is at least partially transparent so as to let light through from the inner surface to the outer surface, the trim element further comprising at least one lighting module extending from the side of the inner surface of the cover layer, the lighting module comprising at least one light source and a first light guide arranged for guiding light from the light source to the backlit areas of the cover layer.

The present invention further relates to a method for producing such trim element.

BACKGROUND

It is known how to provide backlit areas on the outer surface of a trim element in order to illuminate patterns, such as pictograms or decorative patterns, on the outer surface.

To this end, the cover layer comprises at least partially transparent areas having the shape of the patterns to be displayed and light sources are arranged facing opposite the at least partially transparent areas on the inner side of the cover layer in order to light the at least partially transparent areas. In order to provide a good lighting of the backlit areas, the light sources are arranged in "light boxes" extending between the light sources and the backlit areas. The walls of the light box are reflecting so that the light rays coming from the light sources are transmitted by the light boxes to the backlit areas.

However, in order to provide a good homogenization of the light when the light reaches the outer surface of the trim element, it is necessary to provide a certain distance between the light sources and the backlit areas, which increases the thickness of the trim element and the size thereof.

To overcome such drawback, it has been proposed to place the light sources against the inner surface of the light layer and to guide the light to the areas backlit by light guides. However, the quality of the light reaching the backlit areas is not then satisfactory.

It has also been proposed to replace the light sources and the backlit areas by a liquid crystal display (LCD) arranged under the cover layer and displaying images on the outer surface of the cover layer. In this way it is possible to place distinct patterns very close to one another.

However, such a screen is not entirely satisfactory because it requires the addition of a window opposite the screen in the cover layer, which breaks the continuity of appearance of the cover layer, even if the window is arranged so as to have an appearance similar to the appearance of the rest of the cover layer. Furthermore, the difference in contrast between the illuminated and non-illuminated areas on the screen are visible through the window, making the integration of the screen into the trim element too visible from outside the trim element.

SUMMARY

One of the aims of the invention is to overcome these drawbacks by proposing a trim element which does not take up much space and has a satisfactory appearance and which makes it possible to have backlit patterns which are very close to one another.

To this end, the invention relates to a trim element of the aforementioned type, further comprising a switching module extending between the cover layer and the lighting module, the switching module comprising at least two optical shutter areas, at least one optical shutter area extending opposite every backlit pattern area of the cover layer and being configurable between an open position, wherein said optical shutter area lets light pass from the first light guide of the lighting module to the backlit pattern area of the cover layer extending opposite said optical shutter area, and a closed position, wherein said optical shutter area prevents light from getting through from the first light guide to the backlit pattern area extending opposite said optical shutter area.

The use of a switching module is used for selectively lighting a plurality of backlit areas with one lighting module. In this way it is possible to place the backlit areas very close to each other and to reduce the bulk of the trim element. Furthermore, the cover layer has a uniform appearance opposite and around the backlit areas, in particular, when the backlit areas are not illuminated. In other words, the presence of a backlit area is detectable only when it is illuminated by the lighting module.

The trim element may further include one or a plurality of the following features, taken individually or according to any technically conceivable combination:

every optical shutter area has a surface area greater than or equal to the surface area of the backlit pattern area extending opposite said optical shutter area, every backlit pattern area being surrounded at least in part by an opaque area preventing light from passing from the inner surface to the outer surface of the cover layer, the cover layer comprises at least one at least partially transparent aspect layer and at least one masking layer extending against the aspect layer, said masking layer comprising at least two openings, each having the shape of one of the backlit pattern areas of the cover layer, every optical shutter area of the switching module extending opposite an opening in the masking layer, a second light guide consisting of a at least partially transparent element extends against the inner surface of the cover layer, the switching module extending against said at least partially transparent element arranged for guiding light passing through said switching module to the backlit pattern areas of the cover layer, the trim element comprises a support extending around the lighting module and the switching module, said support wrapping a part of the first light guide, said support being made of a reflecting material, the lighting module is mounted on a substrate comprising at least one electrical connection circuit for the light source of the lighting module, the light source being connected to said connection circuit, the switching module is further connected to the connection circuit, the optical shutter areas being electrically fed by said electrical connection circuit, and the distance between the two backlit pattern areas is substantially comprised between 0.3 mm and 2 mm.

According to another aspect, the invention further relates to a method for producing a trim element as described above, comprising the following steps:

producing a cover layer comprising at least two distinct backlit pattern areas, wherein said cover layer is at least partly at least partially transparent so as to let light to pass from an inner surface toward an outer surface of the cover layer, producing a switching module comprising at least two optical shutter areas, producing a lighting module comprising at least one light source and a first light guide, assembling the cover layer, the switching module and the lighting module, by positioning at least one optical shutter area of the switching module opposite every backlit pattern area of the cover layer and positioning the first light guide of the lighting module so that the light emitted by the light source is guided towards the backlit pattern areas of the cover layer through the optical shutter areas of the switching module.

According to an optional feature of the production method, the step of positioning the optical shutter areas of the switching module opposite the backlit pattern areas of the cover layer comprises the following steps:

placing at least one optical shutter area in the open position, at least one light source being arranged for displaying a test pattern on the side of the outer surface of the cover layer passing through said optical shutter area in the open position, placing at least one corresponding test pattern in front of a backlit pattern area of the cover layer extending opposite the optical shutter area in the open position, using an imaging device for acquiring at least one image of the outer surface of the cover layer for determining whether the test pattern displayed by the light source through the optical shutter area in the open position, is superimposed with the test pattern opposite the corresponding backlit pattern area, if the test patterns are not superimposed, moving the switching module with respect to the cover layer so as to superimpose the test patterns before permanently fastening the cover layer, the switching module and the lighting module.

BRIEF DESCRIPTION OF THE DRAWINGS

Other aspects and advantages of the invention will appear upon reading the following description, given only as an example, and made in reference to the enclosed drawings, wherein.

DETAILED DESCRIPTION

Figure 1:
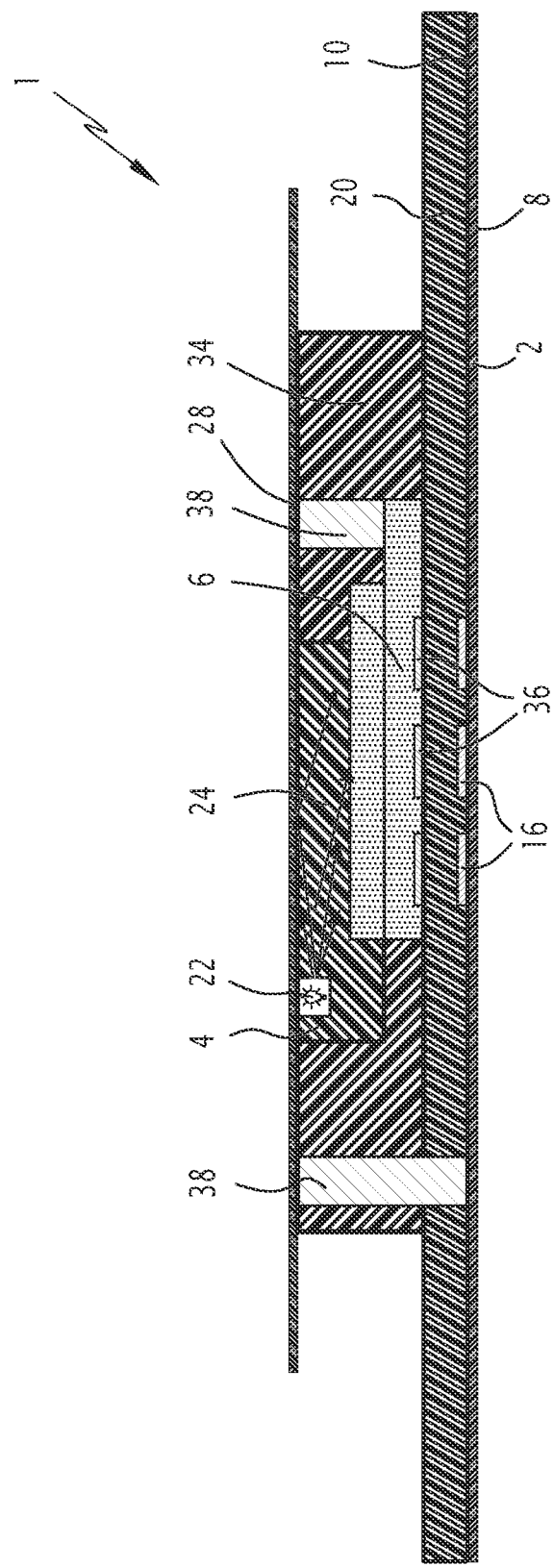
FIG. 1 is a diagrammatical representation, in a sectional view, of a trim element according to an embodiment of the invention.

With reference to FIG. 1, a vehicle trim element 1 is described, comprising a cover layer 2, a lighting module 4, and a switching module 6. Such a trim element 1 forms for example all or part of a door panel, a central console, a vehicle dashboard or other.

The cover layer 2 comprises an outer surface 8 forming at least a part of the visible surface of the trim element 1, and an inner surface 10 opposite the outer surface 8 and extending from the inner side of the trim element 1. Thus, the outer surface 8 gives the appearance thereof to at least a part of the trim element 1 while the inner surface 10 is intended to be oriented toward the part of the vehicle on which the trim element 1 is intended to be fitted. The cover layer 2 can comprise a plurality of layers. According to the embodiment shown in FIGS. 1 and 2, the cover layer 2 thus comprises at least one aspect layer 12, defining the outer surface of the cover layer 2, and a masking layer 14, defining the inner surface 10 of the cover layer 2. As will be subsequently described with reference to another embodiment, the cover layer 2 can comprise other layers.

Figure 6:
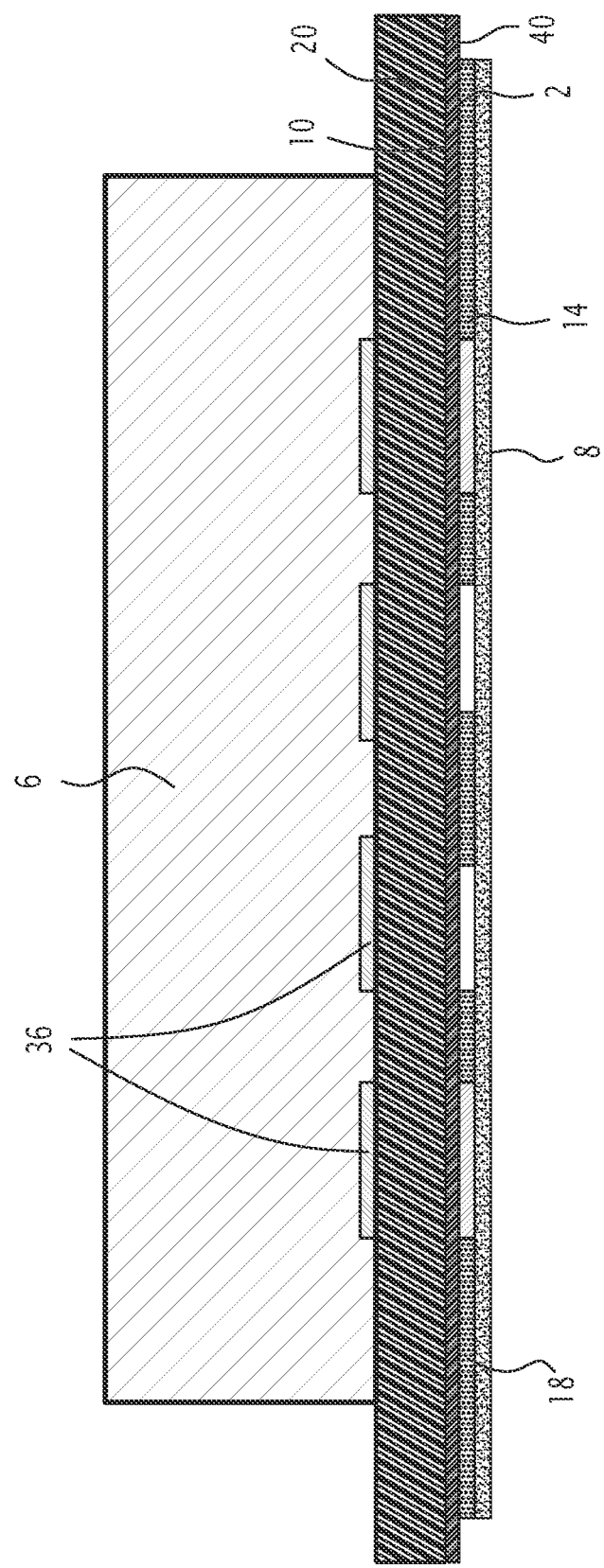

The aspect layer 12 is for example substantially continuous and covers all or part of the trim element 1. Opposite the outer surface 8, the aspect layer 12 comprises an underside surface over which the masking layer 14 extends. The aspect layer 12 is for example substantially at least partially transparent, i.e. it lets light pass from the underside surface to the outer surface 8. "At least partially transparent" refers to a light transmission rate comprised between 5% and 100%, 100% corresponding to a transparent layer. The transparency of the aspect layer 12 can be obtained either through the material forming the aspect layer 12 or due to the thickness thereof. In a variant, only certain areas of the aspect layer 12 are at least partially transparent, for example by making perforations in the aspect layer 12 in said areas. The aspect layer 12 is for example formed by a skin which can consist of any suitable material, such as a plastic material, a ligneous material or other. According to the embodiment of FIGS. 1, 2 and 4, the aspect layer 12 consists of a substrate having a thickness substantially greater than or equal to 0.175 mm and for example substantially less than or equal to 2 mm. The aspect layer 12 can comprise, on the side of the outer surface 8, an anti-scratch protection and/or any other treatment suitable for preserving the aspect layer 12. The aspect layer 12 is for example made of a plastic material, such as polycarbonate (PC), polyethylene terephthalate (PET), polymethyl methacrylate (PMMA) or polycarbonate/polymethyl methacrylate (PC/PMMA). As a variant, as shown in FIG. 6, the aspect layer 12 can be a simple layer of varnish applied to the masking layer 14.

The masking layer 14 extends over the underside surface of the aspect layer 12 and comprises at least two backlit pattern areas 16 and at least one opaque area 18.

Every backlit pattern area 16 is at least partially transparent or even transparent, so as to let light pass through the masking layer 14 from the inner surface 10 to the aspect layer 12 in the at least partially transparent part or parts of every backlit pattern area 16. According to one embodiment, the backlit pattern areas 16 are formed by openings extending through the masking layer 14, as will be subsequently described. The backlit pattern areas 16 are arranged opposite a at least partially transparent area of the aspect layer 12 so that light passing through a backlit pattern area 16 is transmitted to the outer surface 8 of the cover layer 2 so as to be visible from the outside of the trim element 1. Every backlit pattern area 16 can have any desired shape depending on what is desired to be displayed on the outer surface 8 of the cover layer 2. Thus, a backlit pattern area 16 has for example the shape of a pictogram or a pattern to be displayed. A backlit pattern area 16 can let light through over the entire surface thereof, for example by consisting of only one opening. As a variant, within a backlit pattern area 16, parts letting light through and parts blocking the passage of light can be provided so as to define the shape to be displayed on the outer surface 8 of the cover layer 2.

The shape of the backlit pattern areas 16 can differ from one backlit pattern area 16 to another. The cover layer 2 can comprise more than two backlit pattern areas 16, depending on what is desired to be displayed on the outer surface 8 of the cover layer 2.

The opaque area 18 is arranged so as to prevent the passage of light through the opaque area 18, from the inner surface 10 toward the aspect layer 12. Opaque refers to a transmission rate less than 5%, preferentially close to or equal to 0%. Such opacity is obtained by the material used for producing the opaque area 18 and/or by means of the thickness of the masking layer 14. However, in order to limit the bulk of the trim element, the opacity should be preferentially obtained by using an opaque material even with a very small thickness. The opaque area 18 extends at least between the backlit pattern areas 16 so as to separate the backlit pattern areas. Separating means that the backlit pattern areas 16 do not communicate with each other so that light passing through one backlit pattern area 16 is not transmitted to another backlit pattern area. As will be subsequently described, the backlit pattern areas can be brought close together, while being separated by an opaque area 18. Close together means that the distance between two backlit pattern areas is for example substantially comprised between 0.3 mm and 2 mm, the distance being measured between the two points closest to one another of the backlit pattern areas. As shown in the figures, the opaque area 18 can also extend around the backlit pattern areas 16 and form the entire masking layer 14 outside the backlit pattern areas 16. A plurality of opaque areas 18 can be provided, for example when a backlit pattern area extends over a whole part of the trim element requiring an interruption of the opaque area 18.

Figure 2:
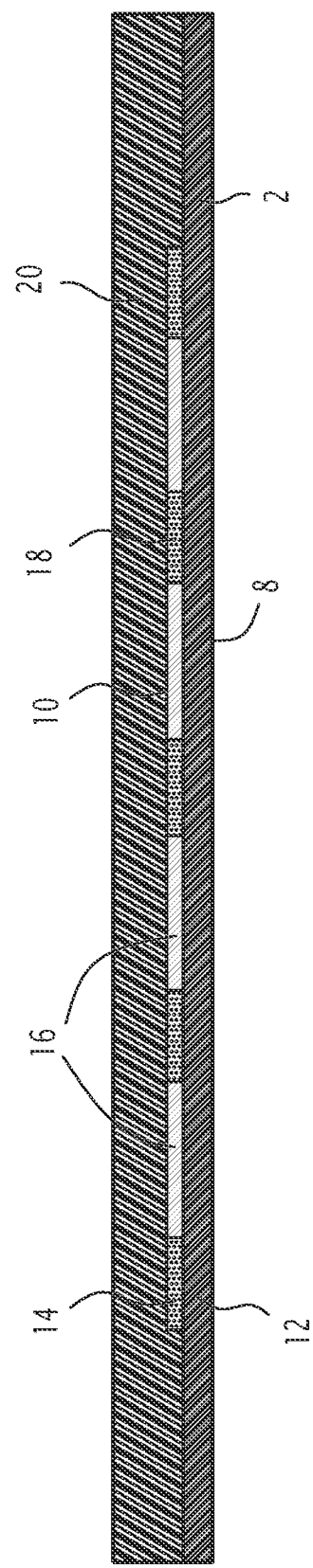
FIG. 2 is a diagrammatical representation, in a sectional view, of the cover layer and a second light guide of the trim element shown in FIG. 1.

As shown in FIG. 2 and as described above, the backlit pattern areas 16 can be formed by openings in the opaque area 18, the shape of the openings defining the shape of the backlit pattern areas. Thus, when a backlit pattern area 16 lets light through over the entire surface thereof, said area consists of only one opening in the opaque area 18. When a backlit pattern area comprises parts letting light through and parts blocking the light, said area is formed by a plurality of openings in the opaque area 18, every opening having the shape of one of the parts letting light through from the backlit pattern area and the parts blocking the passage of the light being formed by opaque area portions 18 around the openings.

According to one embodiment, the masking layer 14 is obtained by printing, for example an opaque ink, on the underside surface of the aspect layer 12, parts of the underside surface not being printed so as to define the openings forming the backlit pattern areas. Such a masking layer 14 has for example a light absorption rate greater than or equal to 95%. According to a particular embodiment, the backlit pattern areas 16 are printed with a at least partially transparent material, for example a colored ink, in order to give a particular appearance to the light passing through the backlit pattern areas 16 and displayed on the outer surface 8 of the cover layer 2. Different colors can for example be provided for the different backlit pattern areas 16 so that the different pictograms or patterns displayed on the outer surface 8 of the cover layer 2 have a different appearance from one another.

As indicated above, the cover layer 2 can comprise other layers, as will be subsequently described. As a variant, the cover layer 2 comprises only a single layer comprising the backlit pattern areas 16 and the opaque area or areas 18 which then extend from the inner surface 10 to the outer surface 8.

According to one embodiment, an at least partially transparent element 20 extends against the inner surface 10 of the cover layer 2 and forms a light guide toward the cover layer 2, as will be subsequently described. The at least partially transparent element 20 is for example made of a at least partially transparent plastic material, for example a resin injected onto the inner surface 10 of the cover layer 2. The material of the at least partially transparent element 20 is for example polycarbonate (PC), polyethylene terephthalate (PET), polymethyl methacrylate (PMMA), polycarbonate/polymethyl methacrylate (PC/PMMA), acrylonitrile butadiene styrene (ABS) or other. The at least partially transparent element 20 has for example a thickness less than or equal to 2 mm and a refractive index substantially comprised between 1.2 and 1.9. The at least partially transparent element 20 is for example slightly smoky in order so as to give a particular appearance to the light passing through thereof and then passing through the backlit pattern areas 16 so as to be visible on the outer surface 8 of the aspect layer 2.

The lighting module 4 extends on the side of the inner surface 10 of the cover layer 2 at least opposite the backlit pattern areas 16 of the cover layer and is arranged to emit light toward the backlit pattern areas 16 for displaying illuminated pictograms or patterns on the outer surface 8 of the cover layer 2.

The lighting module 4 comprises at least one light source 22 and a first light guide 24 arranged for guiding the light emitted by the light source 22 toward the backlit pattern areas 16 of the cover layer 2.

The light source 22 consists for example of a light-emitting diode emitting light in the visible range. It is understood that the lighting module 4 can comprise a plurality of light sources 22. Advantageously, however, only one light source 22 is used for illuminating a plurality of backlit pattern areas 16, or even all the backlit pattern areas 16, by means of the first light guide 24, which makes it possible to reduce the energy consumption of the lighting module 4.

Figure 3:
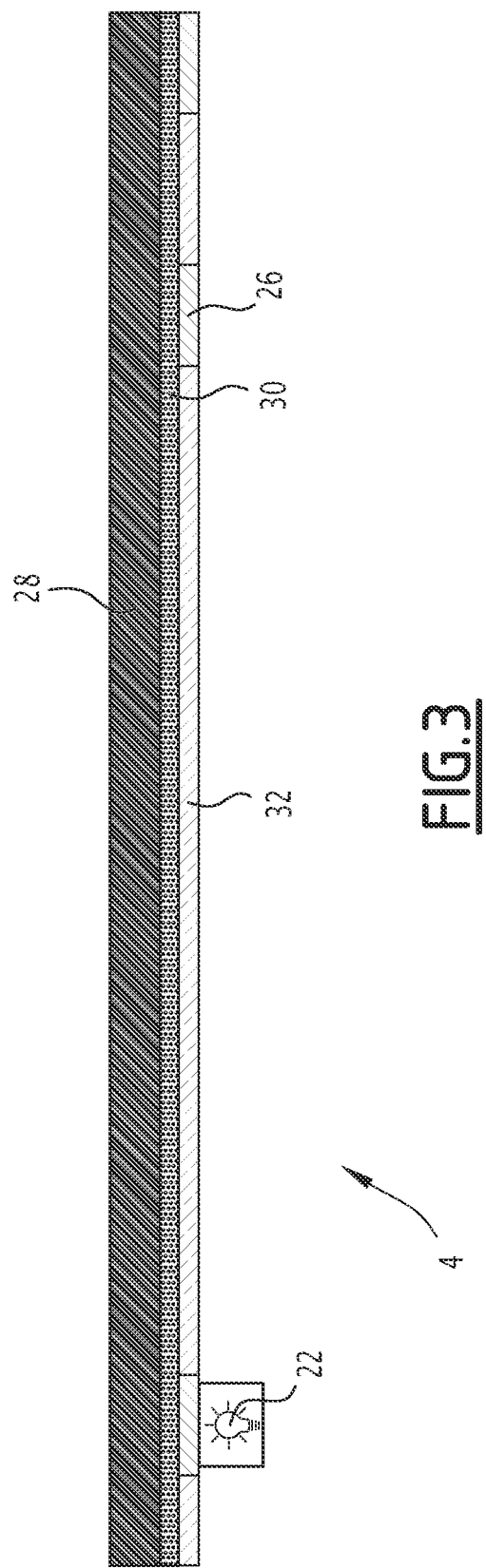
FIG. 3 is a diagrammatical representation, in sectional view, of a part of the lighting module of the trim element of FIG. 1, and FIGS. 4 to 6 are schematic representations, in a sectional view, of a part of a trim element according to an embodiment of the invention, during different steps of the production method for such trim element.

As shown in FIG. 3, the or every light source 22 is for example mounted on an electric power supply circuit 26, more particularly on connection terminals of the electric circuit 26. Such an electrical circuit 26 consists for example of tracks, for example made of silver, carbon or copper ink, printed on a substrate 28 or on an opaque layer 30, the latter being printed as on the substrate 28. The substrate 28 consists for example of a plastic material such as PC, PET, PMMA or PC/PMMA and has a thickness greater than or equal to 0.175 mm and for example less than or equal to 2 mm. The substrate 28 can be shaped so as to have any desired shape, for example a three-dimensional shape matching the shape of the trim element 1 on the inside thereof. The shaping of the substrate 28 is for example carried out by thermoforming.

As a variant, the substrate 28 can consist of a printed circuit board (PCB), integrating the electrical circuit 26. Such a substrate is rigid and is for example made of a composite material based on epoxy resin, for example reinforced with glass fibers (FR-4 composite) or reinforced with glass and cellulose fibers (CEM-1 composite). The printed circuit board has for example a thickness substantially comprised between 0.8 mm and 2 mm.

The opaque layer 30 is for example of the same nature as the masking layer 14 extending over the underside surface of the aspect layer 12 and has an absorption rate greater than or equal to 95%. Furthermore, the opaque layer 30 and/or the substrate 28 are non-conducting.

According to one embodiment, a reflecting layer 32 extends over the opaque layer 30, for example only opposite the lighting module 4 and/or around, on or under the electrical circuit 26, as shown in FIG. 3. In other words, the light traveling through the lighting module 4 and oriented toward the substrate 28 is reflected by the reflecting layer 32. The reflecting layer 32 has a reflection rate greater than or equal to 95%. In a variant, the light source or sources 22 are mounted directly on a printed circuit board.

The light emitted by the light source or sources 22 is injected into the first light guide 24 which is arranged so as to guide the light toward the backlit pattern areas 16. The first light guide 24 has a dimension such that the light is harmonized when arriving on the outer surface 8 depending on the elements extending between the first light guide and the outer surface 8. The harmonization of the light is obtained in particular by means of the reflections inside the light guide 24. For this purpose, the light source(s) 22 are for example not arranged directly opposite the backlit pattern areas along the direction of the thickness of the trim element, but are offset with respect to the backlit pattern areas 16 and the first light guide 24 extends over the substrate 28 or over the opaque layer 30, preferentially over the reflecting layer 32, from the light sources 22 to an area opposite the backlit pattern areas 16 along the direction of the thickness of the trim element so as to bring the light from the light sources 22 to said area, wherein the light leaves the first light guide 24 so as to be directed toward the backlit pattern areas 16. The surface of the first light guide 24 facing the outer surface 8 can be either smooth or grained so as to improve the harmonization or the homogeneity of the light. Along the grained surface of the first light guide 24, the surface graining of the first light guide 24 can vary, for example by varying the density thereof, by providing grains with variable depth and/or by presenting different patterns. The graining is arranged so that the light has satisfactory homogeneity on the outer surface 8 of the trim element 1.

According to one embodiment, the lighting module 4 is arranged so that all the light emitted by the light source or sources 22 is injected into the first light guide 24 in order to illuminate all the backlit pattern areas 16. In other words, this arrangement makes it possible to illuminate all the backlit pattern areas 16 with a single lighting module 4, which makes it possible to save energy and simplify the structure and the connections of the trim element. To this end, the first light guide 24 is for example arranged for wrapping the light source or sources 22. Wrapping means that the material forming the first light guide 24 covers the light source or sources 22 on all sides of the light sources 22 with the exception of the part of the light sources which are mounted on the substrate 28.

The first light guide 24 is made of a material suitable for light transmission, such as a transparent plastic material. Such a material is for example PC or PMMA.

A support 34 extends between the substrate 28, or the opaque layer 30, and the cover layer 2, or the at least partially transparent element 20, around the first light guide 24 and the switching module 6, as shown in FIG. 1. The support 34 gives for example the shape thereof and the rigidity thereof to the trim element 1. The support 34 wraps part of the first light guide 24 and of the switching module 6. The support 34 is arranged in particular for preventing the light coming from the lighting module 4 from "leaking" toward the outside of the trim element 1 outside the path provided for the light through the switching module 6 and the backlit pattern areas 16. The support 34 thus extends around the first light guide 24 and the switching module 6, and in particular over the part of the first light guide 24 which is not covered by the switching module 6, as will be subsequently described. The support 34 is for example made of a reflecting material, having a light reflection rate of greater than or equal to 75% so that light traveling through the first light guide 24 is reflected when the light is incident on a wall of the first light guide 24 or of the switching module 6 which is covered by the support 34, the light thus staying along the provided path. Furthermore, such reflections make it possible to harmonize the light in the first light guide 24. The support 34 is for example made of a plastic material, such as PC, PC ABS or PMMA.

The switching module 6 extends between the lighting module 4 and the covering layer 2, more particularly between a part of the first light guide 24 away from the light source 22 and opposite the backlit pattern areas 16 against the at least partially transparent element 20, as shown in FIG. 1. The switching module 6 is for example laminated on the first light guide 24 and/or on the support 34.

The switching module 6 comprises at least two optical shutter areas 36 each extending opposite a backlit pattern area 16. More particularly, the switching module 6 comprises at least as many optical shutter areas 36 as there are backlit pattern areas 16 and every backlit pattern area 16 extends opposite at least one shutter area 36. Every shutter area 36 can be configured between an open position, wherein the shutter area 36 lets light pass from the lighting module 4 toward the backlit pattern area 16 opposite which the shutter area 36 extends, and a closed position, wherein the shutter area 36 prevents the passage of light from the first light guide 24 toward the backlit pattern area 16 extending opposite the shutter area 36. Every shutter area 36 has a surface area greater than or equal to the surface area of the backlit pattern area 16 opposite which the shutter area 36 extends so that the entire backlit pattern area 16 is illuminated when the shutter area 36 is in the open position.

Every optical shutter area 36 can be controlled independently of the other shutter areas 36, i.e. every shutter area 36 can be placed individually either in the open position or in the closed position.

According to one embodiment, a color filter is placed opposite every optical shutter area 36 or certain shutter areas 36 so as to let through the desired wavelengths of light from the lighting module 4 when the corresponding optical shutter area 36 is in the open position. In this way it is possible to illuminate with different colors, from a single white light source, the different backlit pattern areas 16, for example to transmit specific information to the vehicle passengers.

According to one embodiment, a plurality of optical shutter areas 36 are provided for every backlit pattern area 16, a color filter being associated with every optical shutter area 36. Every optical shutter area 36 for a same backlit pattern area 16 is then provided for illuminating a part of the backlit pattern area 16 in the open position, another optical shutter area 36 for the same backlit pattern area 16 being provided to illuminate another part of the backlit pattern area. By appropriately arranging the different parts illuminated by different optical shutter areas 36 and by dimensioning the optical shutter areas 36 so that the entire backlit pattern area 16 is illuminated by a homogeneous light, for example according to the principle of the different pixels of a screen, it is then possible to illuminate the same backlit pattern area 16 in different colors by placing one or a plurality of optical shutter areas 36 associated with said backlit pattern area 16 in the open position and the other optical shutter areas 36 associated with said area in the closed position.

The switching module 6 consists for example of an either electrochemical or liquid crystal element dispersed in a polymer material known by the term PDLC (for "Polymer Dispersed Liquid Cristal"). Such an element is flexible and is in the form of a film. As a variant, the switching module can be rigid since consisting of for example a segment LCD display, a screen based on thin film transistors (TFT), an electrochemical glass, etc. Such elements make it possible to form optical shutter areas which can be switched between the open position and the closed position by applying an electric current to the optical shutter areas 36. For this purpose, the switching module 6 is for example supplied with electricity by means of the electrical supply circuit 26, through a connection element 38 extending into the support 34, as shown in FIG. 1. It should be noted that in FIG. 1, a further connection element 38 is provided between the cover layer 2 and the electrical circuit 26, the connection element 38 being apt to supply electricity to the cover layer 2, for example when the latter comprises one or a plurality of capacitive films so as to form touch-surfaces on the outer surface 8 of the cover layer 2.

The functioning of the above-described trim element 1 will now be described.

The light source or sources 22 are lit so as to emit light in the first light guide 24 which brings the light to the switching module 6. Depending on the backlit pattern area(s) 16 to be illuminated, for example depending on a particular state of the vehicle or of a vehicle component, the optical shutter area(s) 36 extending opposite the backlit pattern areas 16, are placed in the open position. The optical shutter area(s) 36 extending opposite the backlit pattern areas 16 which are not to be illuminated, are left in the closed position. The light then passes through the optical shutter areas 36 in the open position and not through the areas which are in the closed position. The light is transmitted to the at least partially transparent element 20 which then forms a second light guide transmitting the light to the backlit pattern area(s) 16 which are to be illuminated and not to the others. Due in particular to the small thickness of the at least partially transparent element 20, the light is not transmitted between the different backlit pattern areas. Furthermore, the opaque areas 18 of the masking layer 14 absorb light and thus limit light propagation within the second light guide, thereby preventing light leakage from one backlit pattern area 16 to another.

The at least partially transparent element 20 makes it possible to protect the switching module 6, in particular, from the pressure exerted by a user pressing on the outer surface 8 of the trim element.

The illumination of the backlit pattern areas 16 can be modulated simply by switching the desired optical shutter areas 36 from the closed position to the open position and vice versa. As indicated above, only one light source 22 can be used for all the backlit pattern areas 16 which can be placed very close to one another. When no backlit pattern area is illuminated, the outer surface 8 of the cover layer 2 has a substantially uniform appearance.

A method of making a trim element 1 as described above will now be described.

The different elements of the trim element 1, namely the cover layer 2, the lighting module 4 and the switching module 6 are for example produced separately before being assembled.

According to one embodiment, the cover layer 2 is for example formed by printing the masking layer 14 on the inner surface of the aspect layer 12 so as to produce the backlit pattern areas 16, and the at least partially transparent element 20 is produced by injection over the inner surface of the aspect layer 12 and over the masking layer 14. According to a variant shown in FIGS. 5 and 6, the masking layer 14 is formed on the outer surface of a receiving layer 40 on the underside of which the at least partially transparent element 20 is produced for example by injection. According to such variant, the masking layer 14 does not comprise backlit pattern areas, which will only be produced after an alignment step with the switching module 6, as will be subsequently described. Only at least one window 42 is produced in the masking layer 14 for performing the alignment step. Preferentially, two windows 42 are produced.

The lighting module 4 is formed by assembling the light source or sources 22 on the connection circuit 26, which is for example produced by printing on an opaque layer 30 and/or a reflecting layer 32, the opaque layer 30 consisting of a substrate 28. In a variant, the light source or sources 22 are assembled on a printed circuit board. The first light guide 24 and the support 34 are then produced for example by injection onto the substrate 28 or onto the printed circuit board so that the first light guide 24 wraps the light source or sources 22. Holes are for example made in the support 34 for letting through the connection elements 38.

The switching module 6 is then assembled on the lighting module 4, for example by lamination.

As indicated above, assembling the switching module 6 with the cover layer 2 requires positioning the optical shutter areas 36 opposite the corresponding backlit pattern areas 16 by accurately aligning the shutter areas 36 and the backlit pattern areas 16.

The switching module 6 is first of all positioned "roughly" with respect to the cover layer 2 so as to position the shutter areas 36 opposite the backlit pattern areas 16, without necessarily aligning same with precision.

Figure 5:
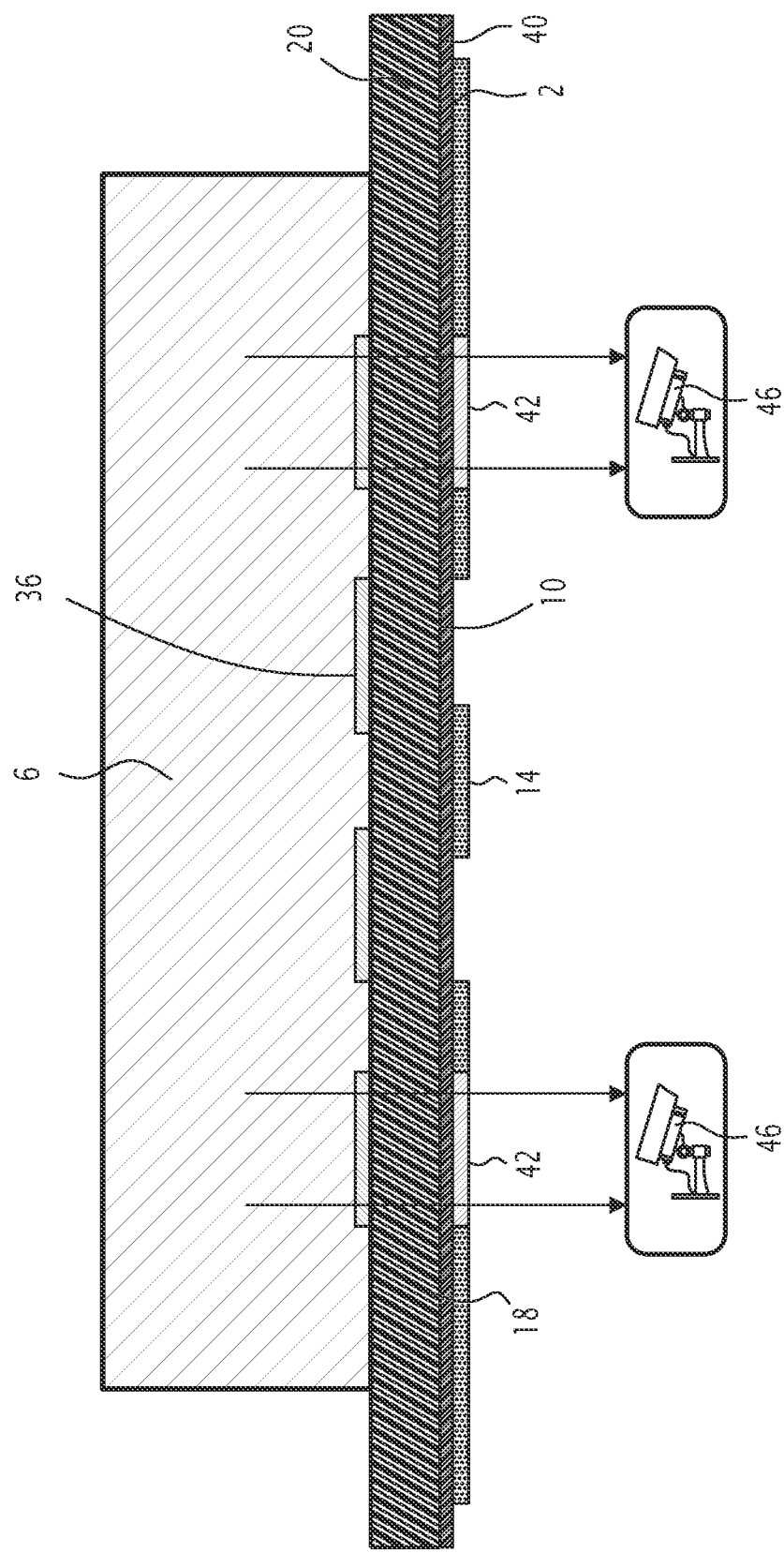

At least one test pattern is placed opposite a backlit pattern area 16, or a window 42 according to the variant shown in FIGS. 5 and 6, on the side of the outer surface 8 of the cover layer 2. The optical shutter area 36 extending opposite the backlit pattern area 16 or the window 42 receiving the test pattern is controlled so as to be in the open position and a light source 44 arranged for displaying a test pattern with the same shape as the test pattern placed on the cover layer 2, being used to illuminate the optical shutter area 36. An imaging device 46, such as a camera, is used on the side of the outer surface 8 of the trim element for acquiring at least one image of the outer surface 8 with the two test patterns and checking whether same are superimposed or not. If the test patterns are not superimposed, the switching module 6 is displaced with respect to the cover layer 2 in order to superpose the test patterns. When the test patterns are superimposed, which can be verified by reproducing the above steps, the switching module 6 is correctly positioned with respect to the backlit pattern areas 16 and the cover layer 2, the switching module 6 and the lighting module 4 able to be permanently fastened. Preferentially, two test patterns are provided for the cover layer 2 in order to make it possible to adjust the positioning of the switching module both according to the length of the cover layer and according to the width thereof.

Figure 4:
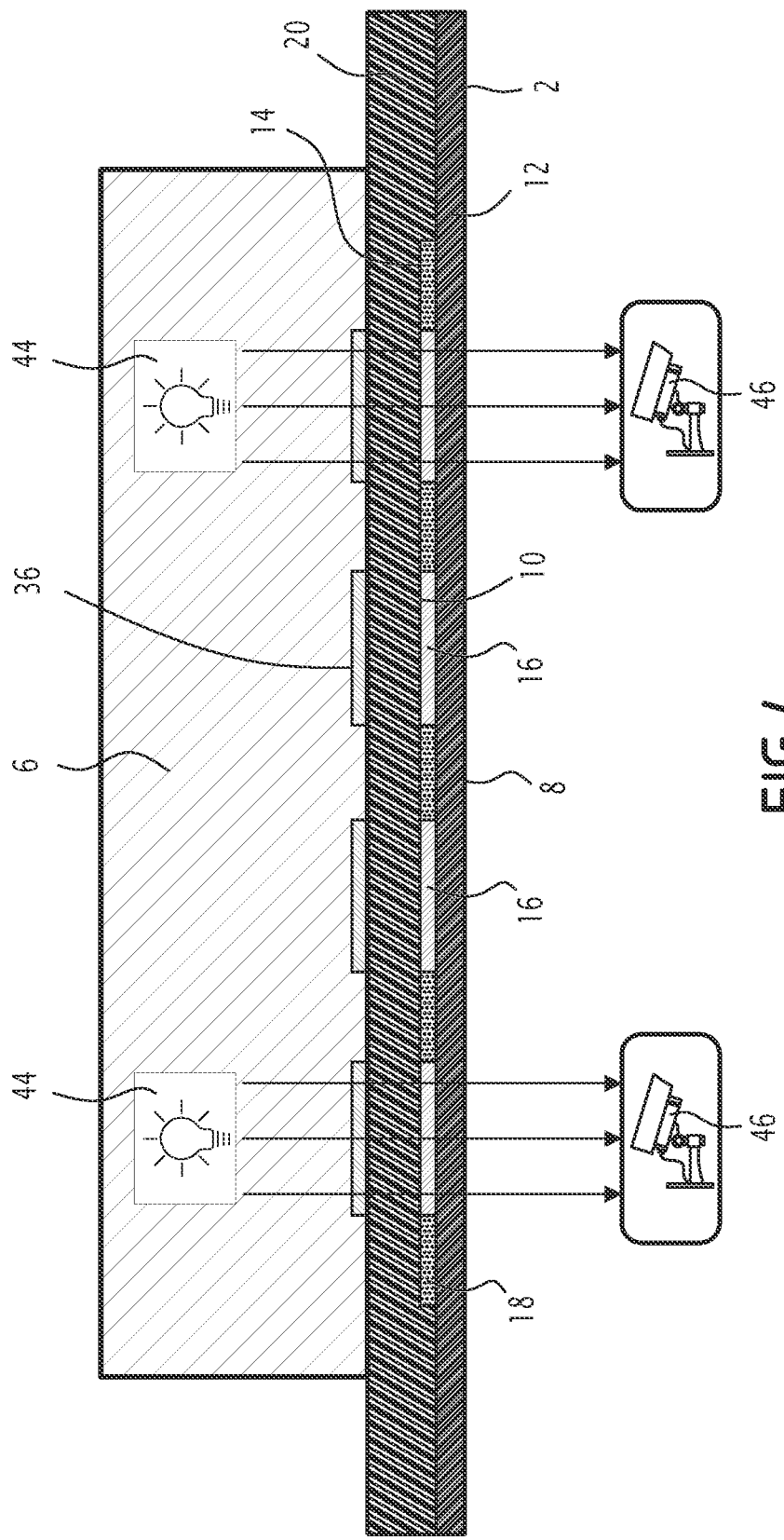

As shown in FIGS. 4 to 6, the alignment is preferentially performed with two test patterns arranged on the cover layer 2 and two light sources 44 arranged for displaying corresponding test patterns. In such case, two corresponding optical shutter areas 36 are placed in the open position. In a variant, the light source 22 is used as the only one light source for displaying all the test patterns, the light being conveyed to the test patterns by the first light guide 24.

According to the variant shown in FIGS. 5 and 6, the backlit pattern areas 16 are produced in the masking layer 14 after the alignment step described above, for example by laser scratching opposite the optical shutter areas 36. A aspect layer 12, for example consisting of an anti-scratch coating, is then deposited on the masking layer 14, as shown in FIG. 6.

The above-described method can be used for obtaining a trim element 1 of which backlit pattern areas 16 are illuminated with precision, which makes it possible to have sharp patterns displayed on the outer surface 2 of the cover layer 2.

The invention claimed is:

1. A vehicle trim element comprising:
   a cover layer defining an outer surface and an inner surface opposite the outer surface, said cover layer comprising at least two distinct backlit pattern areas, wherein said cover layer is at least partially transparent so as to let light pass from the inner surface to the outer surface;
   at least one lighting module extending from the side of the inner surface of the cover layer, said lighting module comprising at least one light source and a first light guide arranged for guiding light from the light source to the backlit areas of the cover layer; and
   a switching module extending between the cover layer and the lighting module, the switching module comprising at least two optical shutter areas, at least one optical shutter area extending opposite every backlit pattern area of the cover layer and being configurable between an open position, wherein said optical shutter area lets light pass from the first light guide of the lighting module toward the backlit pattern area of the cover layer extending opposite said optical shutter area, and a closed position, wherein said optical shutter area prevents light from passing from the first light guide toward the backlit pattern area extending opposite said optical shutter area.

2. The trim element according to claim 1, wherein every optical shutter area has a surface area greater than or equal to the surface area of the backlit pattern area extending opposite said optical shutter area, every backlit pattern area being surrounded at least in part by an opaque area preventing light from passing from the inner surface to the outer surface of the cover layer.

3. The trim element according to claim 1, wherein the cover layer comprises at least one at least partially transparent aspect layer and at least one masking layer extending against the aspect layer, said masking layer comprising at least two openings, each having the shape of one of the backlit pattern areas of the cover layer, every optical shutter area of the switching module extending opposite an opening of the masking layer.

4. The trim element according to claim 1, wherein a second light guide formed by a at least partially transparent element extends against the inner surface of the cover layer, the switching module extending against said at least partially transparent element arranged for guiding light passing through said switching module toward the backlit pattern areas of the cover layer.

5. The trim element according to claim 1, comprising a support extending around the lighting module and the switching module, said support wrapping a portion of the first light guide, said support being made of a reflecting material.

6. The trim element according to claim 1, wherein the lighting module is mounted on a substrate comprising at least one electrical connection circuit of the light source of the lighting module, the light source being connected to said connection circuit.

7. The trim element according to claim 6, wherein the switching module is further connected to the connecting circuit, the optical shutter areas being electrically supplied by said electrical connecting circuit.

8. The trim element according to claim 1, wherein the distance between the two backlit pattern areas is substantially comprised between 0.3 mm and 2 mm.

9. A manufacturing method for a trim element according to claim 1, comprising the following steps:
   producing a cover layer comprising at least two distinct backlit pattern areas, wherein said cover layer is at least partly at least partially transparent so as to let light pass from an inner surface toward an outer surface of the cover layer,
   producing a switching module comprising at least two optical shutter areas,
   producing a lighting module comprising at least one light source and a first light guide,
   assembling the cover layer, the switching module and the lighting module by positioning at least one optical shutter area of the switching module opposite every backlit pattern area of the cover layer and positioning the first light guide of the lighting module so that the light emitted by the light source is guided toward the backlit pattern areas of the cover layer through the optical shutter areas of the switching module.

10. The manufacturing method according to claim 9, wherein the step of positioning the optical shutter areas of the switching module opposite the backlit pattern areas of the cover layer comprises the following steps:
   placing at least one optical shutter area in the open position, at least one light source being arranged for displaying a test pattern on the side of the outer surface of the cover layer through said optical shutter area in the open position,
   placing at least one corresponding test pattern opposite a backlit pattern area of the cover layer extending opposite the optical shutter area in the open position,
   using an imaging device for acquiring at least one image of the outer surface of the cover layer for determining whether the test pattern displayed by the light source through the optical shutter area in the open position is superimposed with the test pattern opposite the corresponding backlit pattern area,
   if the test patterns are not superimposed, moving the switching module with respect to the cover layer so as to superpose the test patterns before permanently fastening the cover layer, the switching module, and the lighting module.

* * * * *